(12) United States Patent
Caskey et al.

(10) Patent No.: US 9,452,414 B2
(45) Date of Patent: Sep. 27, 2016

(54) METAL IMPREGNATED ZEOLITE ADSORBENTS, METHODS OF MAKING, AND SYSTEMS FOR USING THE SAME

(71) Applicant: UOP LLC, Des Plaines, IL (US)

(72) Inventors: Stephen Caskey, Lake Villa, IL (US); Vladislav Ivanov Kanazirev, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 139 days.

(21) Appl. No.: 14/266,607

(22) Filed: Apr. 30, 2014

(65) Prior Publication Data

US 2015/0314264 A1  Nov. 5, 2015

(51) Int. Cl.
*B01J 20/18* (2006.01)
*C10G 25/05* (2006.01)
*C10G 25/03* (2006.01)

(52) U.S. Cl.
CPC ............... *B01J 20/18* (2013.01); *B01J 20/186* (2013.01); *C10G 25/03* (2013.01); *C10G 25/05* (2013.01)

(58) Field of Classification Search
CPC ....... B01J 20/186; B01J 20/18; C10G 25/05; C10G 25/03
See application file for complete search history.

(56) References Cited

U.S. PATENT DOCUMENTS

| | | | |
|---|---|---|---|
| 3,503,958 A * | 3/1970 | Landis | B01J 29/061 208/46 |
| 3,516,786 A * | 6/1970 | Maher | C01B 33/2807 423/710 |
| 3,792,106 A | 2/1974 | Regier | |
| 4,417,088 A | 11/1983 | Miller | |
| 4,511,746 A | 4/1985 | Miller | |
| 4,751,339 A | 6/1988 | Beech, Jr. et al. | |
| 5,070,052 A | 12/1991 | Brownscombe et al. | |
| 5,194,244 A | 3/1993 | Brownscombe et al. | |
| 5,583,081 A | 12/1996 | Price et al. | |
| 5,932,509 A | 8/1999 | Balse et al. | |
| 6,700,027 B1 | 3/2004 | Johnson et al. | |
| 7,011,695 B2 | 3/2006 | Moreau et al. | |
| 7,083,714 B2 | 8/2006 | Elomari | |
| 7,115,154 B1 | 10/2006 | Kanazirev | |
| 8,147,588 B2 | 4/2012 | Dolan et al. | |
| 2003/0073566 A1 | 4/2003 | Marshall et al. | |
| 2004/0176655 A1* | 9/2004 | Ayoub | C07C 2/64 585/324 |
| 2005/0101808 A1* | 5/2005 | Ayoub | C07C 29/16 568/909 |
| 2005/0258077 A1* | 11/2005 | Landau | B01J 20/02 208/244 |
| 2011/0079145 A1 | 4/2011 | Dolan et al. | |
| 2011/0184165 A1* | 7/2011 | Bouvier | B01J 20/18 536/127 |
| 2011/0217623 A1* | 9/2011 | Jiang | H01M 8/1016 429/495 |
| 2012/0316303 A1 | 12/2012 | Hanton et al. | |

FOREIGN PATENT DOCUMENTS

| | | | | |
|---|---|---|---|---|
| CN | WO 2009046636 A1 * | 4/2009 | | C11C 3/003 |
| DE | 1442589 | 10/1968 | | |
| WO | 9408925 A1 | 4/1994 | | |
| WO | 0236489 A1 | 5/2002 | | |

OTHER PUBLICATIONS

Kazansky, et al., "Nature of the Sites of Dissociative Adsorption of Dihydrogen and Light Paraffins in ZnHZSM-5 Zeolite Prepared by Incipient Wetness Impregnation," Catalysis Letters, v 66, n 1/2, p. 39-47, May 2000, ISSN: 1011372X, Publisher: Kluwer Academic Publishers.
Zhao, et al., "Aromatization of FCC Gasoline Over Modified HZSM-5 Catalyst," Petroleum Science and Technology, v 25, n 5, p. 577-584, May 2007, ISSN: 10916466, DOI: 10.1080/10916460600803611, Publisher: Taylor and Francis Inc.
Biscardi, et al., "Structure and Function of Metal Cations in Light Alkane Reactions Catalyzed by Modified H-ZSM5," Catalysis Today, v 31, n 3-4, p. 207-31, Dec. 5, 1996, ISSN: 09205861, Publisher: Elsevier.
Kanai, et al., "Aromatization of N-Hexane Over ZnO/H-ZSM-5 Catalysts," J. Catal., v 114, n 2, p. 284-90, Dec. 1988, ISSN: 00219517, Publisher: Academic Press.
Search Report dated Jun. 29, 2015 for corresponding PCT Appl. No. PCT/US2015/025056.

* cited by examiner

*Primary Examiner* — Regina M Yoo

(57) ABSTRACT

Metal exchanged and impregnated zeolite materials, methods for making metal exchanged and impregnated zeolite materials, and systems for reducing an amount of a contaminant species in a feed stream using a metal exchanged and impregnated zeolite material are provided. An exemplary metal exchanged and impregnated zeolite material comprises a metal exchanged zeolite material with the formula $((M_{2/n}O)_a \cdot (M'_{2/n}O)_{a'}) \cdot Al_2O_3 \cdot bSiO_2$; and a metal oxide with the formula $M_{2/n}O$ impregnated in the metal exchanged zeolite material such that the metal oxide is contacting an interior surface of the pore structure of the metal exchange zeolite material. In this example, M is a cation of an alkali or alkaline earth metal, n is a valence state of metal cation M, M' is a cation of a metal other than an alkali or alkaline earth metal, n' is a valence state of metal cation M', $0 \leq a < 1$, $0 < a' \leq 1$, $a + a' = 1$, and b is about 2 to about 500.

14 Claims, 1 Drawing Sheet

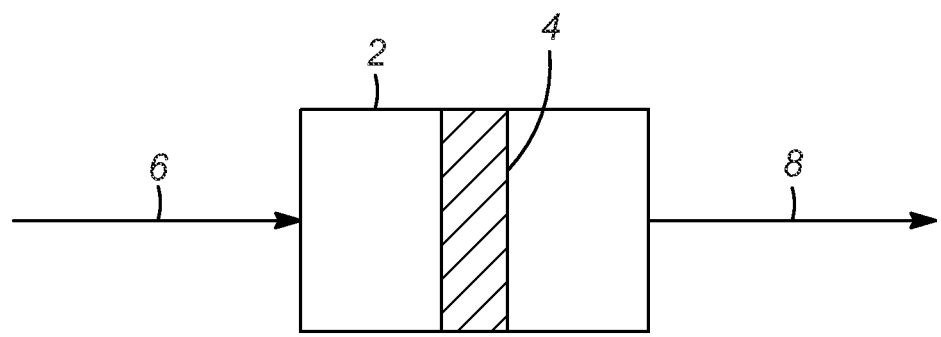

ions, and systems for using the same. More particularly, the technical field relates to metal impregnated zeolite adsorbent materials, methods of making, and systems for using the same.

BACKGROUND

Zeolites are microporous, aluminosilicate materials commonly used as commercial adsorbents and catalysts. Zeolites owe their adsorbent capacity to their regular pore structure of molecular dimensions. This regular pore structure provides zeolites an ability to selectively sort molecules based primarily on a size exclusion process.

When in an acid form, zeolite materials are also capable of catalyzing certain reactions, such as oligomerization and isomerization of components of many olefinic streams. Further, when used to remove or reduce undesired species from a reactive olefinic stream, zeolitic materials are subjected to repeated harsh regeneration cycles that occur during the life of the adsorbent. The conditions of the regeneration cycles encourage catalytic activity of the adsorbent, which leads to diminished adsorbent capacity and limited life span due to coking.

Unfortunately, certain zeolite materials that are otherwise suitable for removal or reduction of certain undesired compounds that may be present in an olefinic stream, such as organic sulfur-containing species, are particularly susceptible to problems arising from reacting with components in the olefinic stream. For instance, ZnX is an 80% ion exchanged Zn-based X-type zeolite which contains about 15% Zn on a volatile free basis. ZnX shows excellent organic sulfur removal behavior when used as an adsorbent for olefin streams. However, ZnX also displays high reactivity with olefins in terms of isomerization and oligomerization, leading to significant problems with coking and shortened lifespan. Thus, ZnX's reactivity with olefins limits ZnX's utility as an adsorbent for use with olefinic streams.

Accordingly, it is desirable to provide zeolites with satisfactory adsorbent behavior but reduced reactivity for use with olefinic streams. In addition, it is desirable to provide methods and systems for using such zeolites. Furthermore, other desirable features and characteristics of the present invention will become apparent from the subsequent detailed description and the appended claims, taken in conjunction with the accompanying drawings and this background.

BRIEF SUMMARY

Metal exchanged and impregnated zeolite materials, methods for making metal exchanged and impregnated zeolite materials, and systems for reducing an amount of a contaminant species in a feedstock using a metal exchanged and impregnated zeolite material are provided herein. In an exemplary embodiment, a metal exchanged and impregnated zeolite material comprises a metal exchanged zeolite material with the formula $((M_{2/n}O)_a \cdot (M'_{2/n}O)_{a'}) \cdot Al_2O_3 \cdot bSiO_2$; and a metal oxide with the formula $M_{2/n}O$ impregnated in the metal exchanged zeolite material such that the metal oxide is contacting an interior surface of the pore structure of the metal exchange zeolite material. In this embodiment, M is a cation of an alkali or alkaline earth metal, n is a valence state of metal cation M, M' is a cation of a metal other than an alkali or alkaline earth metal, n' is a valence state of metal cation M', $0 \leq a < 1$, $0 < a' \leq 1$, $a + a' = 1$, and x is about 2 to about 500.

In another exemplary embodiment, a method for making a metal exchanged and impregnated zeolite material comprises admixing a solid zeolite comprising metal cation M occupying metal exchange sites in the solid zeolite and a solid salt comprising a metal cation M' to form a solid salt/zeolite mixture, where M is a cation of an alkali or alkaline earth metal and M' is a cation of a metal other than an alkali or alkaline earth metal; and heating the solid salt/zeolite mixture in the absence of liquid water to a temperature sufficient for metal cation M' to migrate and exchange into at least a portion of the metal exchange sites in the solid zeolite to form a metal exchanged and impregnated zeolite material that is impregnated at least with an oxide comprising metal cation M. In this embodiment, the solid salt has a melting temperature at or below a temperature at which a pore structure of the solid zeolite is damaged, and the solid salt/zeolite mixture is heated to a temperature at or below a temperature at which a pore structure of the solid zeolite is damaged.

Also provided herein are systems for reducing an amount of a contaminant species in a feed stream. In an exemplary embodiment, a system comprises a column configured to contain a metal exchanged and impregnated zeolite material, and further configured to receive and contact a feed stream with the metal exchanged and impregnated zeolite material under conditions effective for at least a portion of a contaminant species in the feed stream to be adsorbed by the metal exchanged and impregnated zeolite material. In this embodiment, the metal exchanged and impregnated zeolite material comprises a metal exchanged zeolite material with the formula $((M_{2/n}O)_a \cdot (M'_{2/n}O)_{a'}) \cdot Al_2O_3 \cdot bSiO_2$; and a metal oxide with the formula $M_{2/n}O$ impregnated in the metal exchanged zeolite material such that the metal oxide is contacting an interior surface of the pore structure of the metal exchange zeolite material, where M is a cation of an alkali or alkaline earth metal, n is a valence state of metal cation M, M' is a cation of a metal other than an alkali or alkaline earth metal, n' is a valence state of metal cation M', $0 \leq a < 1$, $0 < a' \leq 1$, $a + a' = 1$, and x is about 2 to about 500.

DETAILED DESCRIPTION OF THE DRAWINGS

The various embodiments will hereinafter be described in conjunction with the following drawing figures, wherein like numerals denote like elements, and wherein:

FIG. 1 is a schematic illustration of a system for reducing the amount of a contaminant species in a feed stream in accordance with an exemplary embodiment.

DETAILED DESCRIPTION

The following detailed description is merely exemplary in nature and is not intended to limit the various embodiments or the application and uses thereof.

Furthermore, there is no intention to be bound by any theory presented in the preceding background or the following detailed description.

Metal impregnated zeolite adsorbents, methods of making, methods of using, and systems for using the same are described herein. Metal impregnated zeolite materials described herein may be used as adsorbents, such as for removal or reduction of organic sulfur compounds from an olefinic stream, while exhibiting reduced reactivity towards olefins.

Zeolites are crystalline aluminosilicate compositions which are microporous and which have a three-dimensional oxide framework formed from corner sharing $AlO_2$ and $SiO_2$ tetrahedra. Zeolites are characterized by having pore openings of uniform dimensions, having a significant ion exchange capacity, and being capable of reversibly desorbing an adsorbed phase which is dispersed throughout the internal voids of the crystal without significantly displacing any atoms which make up the permanent zeolite crystal structure. In some embodiments, zeolites are those which have a pore opening of about 5 Å to about 10 Å.

In general, zeolites have a composition represented by the empirical formula (on a water free basis) $M_{2/n}O \cdot Al_2O_3 \cdot bSiO_2$, where M is a cation having a valence of "n", and "b" has a value of about 2 to about 500. Typically, cations M in conventional as-synthesized zeolites may be alkali metals, alkaline earth metals, hydrogen ions, ammonium ions, or mixtures thereof. However, in embodiments provide herein, cations M in zeolite starting materials are typically cations of an alkali or alkaline earth metal. In some embodiments, zeolites have a $SiO_2/Al_2O_3$ ratio of about 2:1 to about 6:1 (that is, b has a value of about 2 to about 6), and/or have a crystal structure of zeolite X, faujasite, zeolite Y, zeolite A, mordenite, beta, and ferrierite. Various processes for preparation of zeolites are well known in the art.

The zeolite three-dimensional oxide framework carries a negative charge, and requires that a quantity of cations M be present in the channels and/or pores to balance the charge. However, as the cations M are not part of the framework, they are exchangeable and are said to occupy exchange sites within the zeolite. Metal exchange is typically carried out via a solution ion exchange process, which involves contacting a zeolite with a solution containing a dissolved cation under conditions such that the dissolved cation M' from the ion exchange solution displaces (i.e., is exchanged for) a cation M already present in the zeolite. In solution ion exchange processes, cation M' typically is a metal cation of an alkali, alkaline earth, various transition, or rare earth metal.

Specific ion exchange solutions and conditions for typical solution exchange processes vary depending on the particular zeolite and desired cation to be exchanged. For instance, certain cations have limited solubility in basic or neutral ion exchange solutions. So, in order to achieve a sufficiently high concentration of the cation to be exchanged in the ion exchange solution, an acidic ion exchange solution is prepared. However, contacting the zeolite with an acidic ion exchange solution, coupled with the Lewis acidity of the cation to be exchanged itself, generates significant reactive acidic hydroxyl groups on the internal and external surfaces of the zeolite. Further, in solution ion exchange processes, the exchanged cations M from the zeolite leave the zeolite structure and migrate into the ion exchange solution, with at least a portion ultimately leaving the pore structure of the zeolite. Removal of the exchanged cations leads to a further reduction of basic character on the internal and external surfaces of the zeolite, further allowing generation of the acidic hydroxyl groups. Without wishing to be bound by theory, it is believed that these acidic hydroxyl groups lead to high reactivity of the resulting acidic ion exchanged zeolite with olefins.

In embodiments, methods of preparing zeolite materials as described herein avoid, or at least reduce, this problem. Specifically, exemplary embodiments of methods of preparing zeolite materials as described herein do not rely on an acidic ion exchange solution for cation exchange. Rather, exemplary embodiments of methods described herein use solid state techniques such that the zeolite is not contacted with an acidic solution during ion exchange. Further, in some embodiments methods of preparing zeolite materials as described herein are used to prepare exchanged and impregnated zeolite materials. As previously discussed, cation exchange in a zeolite material is where at least a portion of cations M present in exchange sites within the zeolite crystal structure are replaced with a second cation M'. This is distinct from impregnation, where one or more chemical species are present within the pore structure of the zeolite material such that the one or more chemical species contact an interior surface of the pore structure.

In the materials described herein, metal cations M and M' are different metal cations. In some embodiments, metal cation M is a cation of an alkali or alkaline earth metal. In some specific embodiments, metal cation M is a sodium cation. In some embodiments, metal cation M' is a cation of a metal other than an alkali or alkaline earth metal, such as a transition or rare earth metal. In some specific embodiments, metal cation M' is a cation of copper, iron, manganese, silver, or zinc. In some specific embodiments, metal cation M' is a zinc cation. In some embodiments, the one or more impregnated chemical species are one or more oxides comprising metal cation M, or a combination of one or more oxides comprising metal cation M and one or more oxides comprising metal cation M'.

Thus, in some embodiments, a metal impregnated and exchanged zeolite material comprises a metal exchanged zeolite material and a metal oxide present in the metal exchanged zeolite material such that the metal oxide contacts an interior surface of the pore structure of the metal exchanged zeolite material. In these embodiments, the metal exchanged zeolite comprises one or more metal cations (e.g., M' or a combination of M and M') present in exchange sites within the metal exchanged zeolite, and one or more impregnated oxides comprising metal cation M, or a combination of one or more oxides comprising metal cation M and one or more oxides comprising metal cation M', contacting an interior surface of the pore structure of the metal exchanged zeolite material. In some embodiments, both metal cation M and metal cation M' occupy metal exchanged sites within the metal exchanged zeolite. In other embodiments, the extent of exchange is about 100%. That is, in some embodiments metal exchanged zeolites comprise only metal cations M' in metal exchange sites.

Exemplary methods of preparing metal impregnated and exchanged zeolite material will now be discussed. In some embodiments, a solid zeolite material powder or cake (comprising metal cation M in metal exchange sites) is contacted with a salt comprising a metal cation M' to be exchanged into the zeolite. This contact occurs in a dry environment under conditions such that metal cation M' migrates from the salt into the zeolite and exchanges with metal cation M such that at least a portion of metal exchange sites in the zeolite material become occupied by metal cation M'. As used herein, the term "dry environment" means in the absence of liquid water. Thus, in these embodiments, at least a portion of metal exchange sites formerly occupied by metal cation M within the zeolite starting material become occupied with metal cation M' without the zeolite material contacting an acidic solution. As the zeolite material does not contact an acidic solution during the exchange process, generation of acidic hydroxyl groups on the interior and exterior surfaces of the zeolite is greatly reduced.

As metal cations M are exchanged with metal cations M' at various metal exchange sites, the exchanged metal cations M remain in the pores of the metal exchanged zeolite materials as oxides of metal cation M. For instance, in embodiments where the starting solid zeolite material is a sodium zeolite, the exchanged sodium ions remain in the pores of the metal exchanged zeolite material as impregnated sodium oxide ($Na_2O$). Again without wishing to be bound by theory, this impregnated $Na_2O$ adds basic character to the exchanged zeolite pore surface. It is believed that this basic character further inhibits generation of acidic hydroxyl groups. As such, metal impregnated and exchanged zeolite materials prepared according to exemplary embodiments of methods described herein exhibit reduced reactivity with olefins relative to metal exchanged zeolites prepared via solution ion exchange.

Methods for preparing metal impregnated and exchanged zeolite material via a solid state impregnation technique include preparing a mixture comprising a solid zeolite comprising a metal cation M and a solid salt comprising a metal cation M' to be impregnated into a zeolite, wherein metal cation M and metal cation M' are not the same. The mixture is heated in a dry environment to a temperature that allows for migration of metal cations M' from the solid salt into the zeolite structure and exchange with metal cations M. Metal cation migration and exchange may occur at temperatures below the melting point of the solid salt. However, heating to a temperature of at least at or about the melting point of the solid salt facilitates metal cation migration. Additionally, each zeolite material has a temperature above which the zeolite pore structure is damaged. The temperature for metal cation migration and exchange is generally selected to be at or below the temperature at which zeolite damage occurs.

Thus, in some embodiments, the mixture is heated to a temperature of at least at or about the melting point of the solid salt but below a temperature at which the zeolite structure is damaged, and held at a temperature within this range for a time sufficient for metal cations M' from the solid salt to migrate and exchange into the metal exchange sites of the zeolite structure. Times and temperatures of specific embodiments will vary depending on a number of conditions, including the metal cations M and M', the specific solid salt employed, the particular zeolite, and the desired degree of exchange.

Specific solid salts useful in the present methods include those which comprise a metal cation M' that is desired for exchange into the zeolite, and which have a melting point at or below about a temperature at which the zeolite structure is damaged. Suitable salts may include chloride, nitrate, or acetate salts of the desired metal. However, this list is not intended to be limiting as numerous salts of a desired metal may exist that have a melting point at or below the temperature at which a zeolite structure is damaged.

The relative amounts of solid salt and zeolite in the solid salt/zeolite mixture may vary depending on the particular salt and zeolite, the desired degree of exchange, and the intended thermal processing conditions (e.g., time and temperature). In some embodiments, solid salt/zeolite mixtures are prepared such that the mixture has a mole ratio of solid salt to zeolite of between about 0.5:1 to about 2:1, such as about 1:1. For some zeolite materials, the temperature at which the zeolite structure is damaged is about 800° C. Thus, in some embodiments, the solid salt/zeolite mixture is heated to a temperature sufficiently high to allow for migration and exchange of the metal cation M' from the salt into the metal exchange sites of the zeolite structure, with that temperature not exceeding about 800° C. In some embodiments, the solid salt/zeolite mixture is heated to a temperature of about 50° C. to 800° C., such as about 50° C. to 600° C., such as about 50° C. to 400° C., such as about 200° C. to 400° C. The solid salt/zeolite mixture is held at this elevated temperature for a sufficient time for the desired degree of exchange to occur and cooled. As discussed above, as cations of metal M' are exchanged into metal exchange sites of the zeolite material, cations of metal M are displaced and form an oxide within the pore structure of the exchanged zeolite material, thus forming a metal exchanged zeolite (at least partially exchanged with metal cation M') that is impregnated at least with an oxide comprising metal cation M.

In some embodiments, it is desirable for a metal impregnated and exchanged zeolite material to be prepared as a pellet or other bulk solid. Various conventional processes for preparing zeolites as pellets or other bulk solids (such as via extrusion or granulation) may be utilized with the metal impregnated and exchanged zeolite materials described herein. Typical extrusion or granulation processes involve mixing a zeolite with a binder, pressing the mixture into a desired shape, and heat treating the pressed material at a temperature sufficiently high and for a sufficient time such that when the pressed material is cooled the binder is set. In some embodiments, a metal impregnated and exchanged zeolite material prepared as described above is mixed with a binder. This mixture can then be subjected to any suitable forming process, such as extrusion or granulation, and processed to set the binder. Suitable binders may be determined by one of skill in the art, and generally the temperature necessary to set the binder is below the temperature at which a zeolite structure is damaged. Exemplary binders include, but are not limited to, clays, alumina, silica, aluminum silicate, inorganic cement, and various polymers.

In some alternate embodiments where the metal impregnated and exchanged zeolite material is to be prepared as a pellet or other bulk solid, a binder may be included in the solid salt/zeolite mixture prior to thermal treatment for metal exchange. In these embodiments, the solid salt may be selected such that the melting point of the solid salt is at or below the temperature necessary to set the binder. In some embodiments, the methods include preparing a mixture of a solid salt comprising a metal cation to be exchanged into a zeolite, a solid zeolite, and a binder. This mixture may then be subjected to a forming process, such as extrusion or granulation, and heated to a first temperature sufficient to allow metal cations from the solid salt to migrate and exchange into the metal exchange sites of the zeolite structure and thus form a metal impregnated and exchanged zeolite material as provided above.

In some embodiments, the first temperature is also sufficiently high to set the binder. In these embodiments, a solid salt/zeolite/binder mixture may be subjected to a single thermal processing step comprising heating the mixture to a temperature for a sufficient length of time such that only the single thermal processing step is necessary for metal exchange and binder setting. In these embodiments, a suitable temperature will depend on the identity of the solid salt and binder. In some embodiments, a suitable temperature may be about 500° C. to about 700° C., such as about 600° C. to about 700° C.

In some alternative embodiments, metal exchange and binder setting may be conducted via a plurality of thermal processing steps. In these alternative embodiments, a solid salt/zeolite/binder mixture is subjected to a first thermal processing step comprising heating to a first temperature sufficiently high for a sufficient length of time to allow for migration and exchange of a metal cation M' from the salt into the metal exchange sites of the zeolite, as described above. In these embodiments, the first temperature is not sufficiently high to set the binder, thus this first thermal processing step forms a metal impregnated and exchanged zeolite material/binder mixture. The metal impregnated and exchanged zeolite material/binder mixture is then subjected to a second thermal processing step comprising heating to a second temperature sufficiently high for a sufficient period of time to set the binder. In these embodiments, the second temperature is higher than the first temperature. In some related embodiments, a first temperature may be about 50° C. to about 600° C., such as about 50° C. to about 400° C., such as about 200° C. to about 400° C., and a second temperature may be about 600° C. to about 800° C., such as about 600° C. to about 700° C.

Thus in some embodiments, a solid salt/zeolite/binder mixture is subjected to a thermal treatment protocol comprising a first thermal treatment step to form a metal impregnated and exchanged zeolite material/binder mixture, and a second thermal treatment step to set the binder. In some embodiments, the metal impregnated and exchanged zeolite material/binder mixture is not cooled between the first and second thermal processing steps. In alternative embodiments, the thermal treatment protocol may be conducted such that the metal impregnated and exchanged zeolite material/binder mixture is cooled between two thermal processing steps.

In some embodiments, excess solid salt in the solid salt/zeolite mixture migrates into the pore structure of the zeolite material. In these embodiments, the resulting metal impregnated and exchanged zeolite material may further comprise residual solid salt starting material occluded in the pore structure. If the second thermal processing step is conducted at a sufficiently high temperature, subjecting a metal impregnated and exchanged zeolite material/binder mixture to the second thermal processing step as described above may have an added benefit of converting residual occluded solid salt to relatively unreactive oxides of metal M'. Thus, in these embodiments, the metal impregnated and exchanged zeolite material may have one or more oxides comprising metal cation M and one or more oxides comprising metal cation M' impregnated in the pore structure of the final product. Formation of oxides comprising metal cation M' depends on the identity of the solid salt and specific conditions of the second thermal processing step. Specifically, oxides comprising metal cation M' will form if the thermal processing conditions are at a high enough temperature for a long enough period of time to convert the residual solid salt to one or more oxides. In embodiments where removal of residual occluded solid salts is desired, such as in embodiments where conversion of the residual solid salt to metal cation M' oxides is not complete, a metal impregnated and exchanged zeolite material/binder mixture prepared as described herein may be washed with water to reduce the amount of residual occluded solid salts present in the pore structure of the metal impregnated and exchanged zeolite material/binder mixture.

As provided above, the general chemical formula for a zeolite material on a water free basis is $M_{2/n}O \cdot Al_2O_3 \cdot bSiO_2$, where n is the valence state of metal cation M. Exchange of a second metal cation M' into metal exchange sites of zeolite material results in a metal exchanged zeolite material with the general chemical formula of $((M_{2/n}O)_a \cdot (M'_{2/n'}O)_{a'}) \cdot Al_2O_3 \cdot bSiO_2$, where M' is the metal cation that has been exchanged into the zeolite material and n' is the valence state of metal cation M'. In some embodiments, about 10% to about 100%, such as about 25% to about 100%, such as about 50% to about 100%, such as about 75% to about 100%, such as about 90% to about 100%, of metal exchange sites in a metal impregnated and exchanged zeolite material prepared as described above will be occupied with metal cation M'.

As described above, metal cations M originally present in the zeolite metal exchange sites that have been replaced with metal cations M' do not depart the metal exchanged zeolite material. Rather, metal cations M form oxides and remain impregnated in the pore structure contacting an interior surface of the metal impregnated zeolite materials. Thus, metal impregnated and exchanged zeolite material provided herein further comprise an impregnated metal oxide $M_{2/n}O$, wherein M is the metal cation that has been exchanged out of zeolite material, and the amount of metal oxide $M_{2/n}O$ in the metal impregnated and exchanged zeolite material is proportionate to the extent of exchange of metal cation M' for metal cation M. Impregnated metal oxide $M_{2/n}O$ is present in the metal exchanged zeolite material such that metal oxide $M_{2/n}O$ contacts an inner surface in the pore structure of the metal exchanged zeolite material.

As described above, in some embodiments, not all of metal cation M' that migrates into the metal impregnated and exchanged zeolite material is exchanged into a metal exchange site. In these embodiments, the metal impregnated and exchanged zeolite material may further comprise an impregnated metal oxide $M'_{2/n'}O$. In some embodiments, the amount of impregnated metal oxide $M'_{2/n'}O$ in a metal exchanged and impregnated zeolite material may contain up to about 100%, such as up to about 75%, such as up to about 50%, such as about 0% to about 25%, or about 25% to about 50% of the molar equivalent of metal cation M' necessary to fully occupy the metal exchange sites in the zeolite material.

Numerous zeolite materials are known in the art, and methods described herein for preparation of metal impregnated and exchanged zeolite materials may be applied to any zeolite material without limit. In some embodiments, the zeolite starting material is a sodium zeolite with the general chemical formula (on a water free basis) $Na_2O \cdot Al_2O_3 \cdot xSiO_2$, where x provides the molar amount of $SiO_2$ relative to $Al_2O_3$ present in the material. In some embodiments, the zeolite material starting material is the zeolite material known in the art as 13X. Zeolite material 13X has the chemical formula $Na_2O \cdot Al_2O_3 \cdot 2.5SiO_2 \cdot 6H_2O$.

The methods provided herein may be used to prepare any of a number of exchanged and impregnated zeolite materials so long as a suitable solid salt of the desired metal to be exchanged and optionally impregnated, as described above, is available. Exemplary solid salt starting materials may include one or more alkali, alkaline earth, rare earth, and various transition metal cations. As provided above, use of such starting materials results in metal impregnated and exchanged zeolite materials with at least a portion of metal exchange sites in the zeolite material occupied by the one or more alkali, alkaline earth, rare earth, and various transition metal cations from the solid salt starting material.

In some embodiments, exemplary solid salt starting materials include at least one metal cation other than an alkali or alkaline earth metal cation. As provided above, use of such starting materials results in metal impregnated and exchanged zeolite materials with at least a portion of metal exchange sites in the zeolite material occupied by the one or more metal cation other than an alkali or alkaline earth metal cation. In some particular embodiments, solid salt starting materials comprise a copper, iron, manganese, silver, or zinc cation. As provided above, use of such starting materials results in metal impregnated and exchanged zeolite materials with at least a portion of metal exchange sites in the zeolite material occupied by a copper, iron, manganese, silver, or zinc cation. It should be understood that this list is not intended to be limiting, as cations of numerous metals (or complex metal cations) are known to be able to be exchanged into a zeolite structure.

In some particular embodiments, the solid salt starting material comprises a zinc ion. Suitable zinc salts (i.e., those with suitably low melting temperatures) include, but are not limited to, zinc chloride, zinc nitrate, and zinc acetate. As indicated above, suitable thermal treatment conditions will vary depending on the particular solid salt and zeolite material. In some exemplary embodiments, zinc may be exchanged into 13X by preparing a mixture comprising zinc chloride and 13X. The mixture is then heated to a temperature of about 50° C. to about 400° C., such as about 225° C., and held for a sufficient time for the desired degree of exchange to occur. In one particular exemplary embodiment, the mixture comprises zinc chloride and 13X at a mole ratio of about 1:1. This mixture is heated to about 225° C. and held for about 4 hours. This particular set of conditions yields zinc impregnation into the 13X of about 15% exchanged. However, the degree of zinc exchange could be adjusted by increasing or decreasing the mole ratio of zinc chloride to 13X, heating the mixture to a higher or lower temperature, holding the mixture at the elevated temperature for a longer or shorter period of time, or any combination thereof. In addition to being about 15% zinc exchanged, the resulting zeolite material is impregnated with sodium oxide resulting from displaced sodium cations from metal exchange sites as discussed further below.

In some embodiments, methods described herein may be used to prepare metal exchanged and impregnated 13X such that zinc is exchanged into the metal exchange sites of the 13X at about 10% to about 100%, such as about 25% to about 100%, such as about 50% to about 100%, such as about 75% to about 100%, such as about 90% to about 100%. In some embodiments, zinc is exchanged at about 10% to about 100%, such as about 25% to about 100%, such as about 50% to about 100%, such as about 75% to about 100%, such as about. In some related embodiments, the metal exchanged and impregnated 13X may further comprise impregnated zinc oxide up to about 100%, such as up to about 75%, such as up to about 50%, such as about 0% to about 25%, or about 25% to about 50% of the molar equivalent of zinc cation necessary to fully occupy the metal exchange sites in the 13X.

At least a portion of the sodium cations displaced from metal exchange sites in the zinc exchanged 13X in these embodiments does not depart the zinc exchanged zeolite material. Rather, the sodium cations remain impregnated in the pore structure of the zinc exchanged zeolite material as sodium oxide. Thus, a zeolite material prepared as described above is a zinc exchanged and sodium impregnated 13X. In some embodiments, the ratio of sodium to zinc to aluminum in the resulting zinc exchanged and sodium impregnated 13X is from about 2:0.1:2 (at 10% exchanged) to about 2:1.5:2 (at about 100% exchanged with 50% additional zinc impregnation). In some embodiments, the ratio of sodium to zinc to aluminum is from about 2:0.25:2 to about 2:1.5:2, such as about 2:0.5:2 to about 2:1.5:2, such as about 2:0.25:2 to about 2:0.75:2 to about 2:1:2 to about 2:1.5:2. In some embodiments, the ratio of sodium to zinc to aluminum is from about 2:0.1:2 to about 2:1:2, such as about 2:0.25:2 to about 2:1:2, such as about 2:0.5:2 to about 2:1:2, such as about 2:0.75:2 to about 2:1:2, such as about 2:0.9:2 to about 2:1:2.

In other embodiments, methods and systems of reducing an amount of a contaminant species in a feed stream are provided. In these embodiments, a feed stream comprising a species capable of being adsorbed by the metal exchanged and impregnated zeolite materials described herein is contacted with a metal exchanged and impregnated zeolite material described herein under conditions such that the metal exchanged and impregnated zeolite material adsorbs at least a portion of the contaminant species present in the feed stream. In some embodiments, the feed stream is an olefinic feed stream, and the contaminant species is an organic sulfur containing species. In some embodiments, the metal exchanged and impregnated zeolite is a zinc exchanged and sodium impregnated zeolite material as described herein, such as a zinc exchanged and sodium impregnated 13X as described herein.

An exemplary method of reducing an amount of a contaminant species in a feed stream will now be provided with reference to an exemplary system as shown in FIG. 1. An exemplary system includes a column 2 configured to contain one or more metal impregnated zeolite materials as described herein 4. The column 2 is configured to receive a feed stream 6, and contact the feed stream 6 with the one or more metal impregnated zeolite materials 4 under conditions suitable for the adsorption of a contaminant species present in the feed stream 6. An output stream 8 exits column 2 and contains less of the contaminant species than was present in the feed stream 6. In some embodiments, the feed stream 6 comprises an olefinic feed stream. That is, in some embodiments, feed stream 6 comprises one or more olefins. In some embodiments, the one or more metal impregnated zeolite materials 4 comprise a zinc exchanged zeolite material, such as a zinc exchanged sodium zeolite material, such as a zinc exchanged 13X.

Note that reference to the specific arrangement in FIG. 1 is not meant to limit the apparatus and method to the details disclosed therein. Furthermore, FIG. 1 is a schematic illustration and does not show a number of details for the process arrangement such as pumps, compressors, valves, and recycle lines that are well-known to those skilled in the art. For instance, in some embodiments, a system may comprise a plurality of columns arranged in parallel, with each column configured to contain one or more metal impregnated zeolite materials. As will be appreciated, such a configuration allows for one column to be taken off-line and the metal impregnated zeolite materials contained therein to be regenerated or replaced, without disrupting feed stream flow to another column.

Those having skill in the art, with the knowledge gained from the present disclosure, will recognize that various changes could be made in the compositions of matter, methods, and systems described herein without departing from the scope of the present invention. Mechanisms used to explain theoretical or observed phenomena or results, shall be interpreted as illustrative only and not limiting in any way the scope of the appended claims.

What is claimed is:

1. A metal exchanged and impregnated zeolite material comprising:
 a metal exchanged zeolite material with the formula $((M_{2/n}O)_a.(M'_{2/n}O)_{a'}).Al_2O_3.bSiO_2$; and
 a metal oxide with the formula $M_{2/n}O$ impregnated in the metal exchanged zeolite material such that the metal oxide is contacting an interior surface of the pore structure of the metal exchanged zeolite material;

where M is a cation of an alkali or alkaline earth metal, n is a valence state of metal cation M, M' is a cation of a metal other than an alkali or alkaline earth metal, n' is a valence state of metal cation M', $0 \leq a < 1$, $0 < a' \leq 1$, $a+a'=1$, and b is about 2 to about 500 and further comprising a second metal oxide with the formula $M'_{2/n}O$ impregnated in the metal exchanged zeolite material such that the second metal oxide is contacting an interior surface of the pore structure of the metal exchanged zeolite material.

2. The metal exchanged and impregnated zeolite material of claim 1, wherein metal cation M is a sodium cation.

3. The metal exchanged and impregnated zeolite material of claim 1, wherein metal cation M' is a copper, zinc, manganese, silver, or iron cation.

4. The metal exchanged and impregnated zeolite material of claim 1, wherein metal cation M is a sodium cation and metal cation M' is a zinc cation.

5. The metal exchanged and impregnated zeolite material of claim 4, wherein the metal exchanged zeolite material is zinc exchanged 13X.

6. The metal exchanged and impregnated zeolite material of claim 5, wherein the metal exchanged and impregnated zeolite material has a molar ratio of Na:Zn:Al of about 2:0.1:2 to about 2:1:2.

7. The metal exchanged and impregnated zeolite material of claim 5, wherein the metal exchanged and impregnated zeolite material has a molar ratio of Na:Zn:Al of about 2:1:2 to about 2:1.5:2.

8. A metal exchanged and impregnated zeolite material comprising:

a metal exchanged zeolite material with the formula $((M_{2/n}O)_a \cdot (M'_{2/n}O)_{a'}) \cdot Al_2O_3 \cdot bSiO_2$; and a metal oxide with the formula $M_{2/n}O$ impregnated in the metal exchanged zeolite material such that the metal oxide is contacting an interior surface of the pore structure of the metal exchanged zeolite material;

where M is a cation of an alkali or alkaline earth metal, n is a valence state of metal cation M, M' is a cation of a metal other than an alkali or alkaline earth metal, n' is a valence state of metal cation M', $0 \leq a < 1$, $0 < a' \leq 1$, $a+a'=1$, and b is about 2 to about 500 and wherein the metal exchanged and impregnated zeolite material has a molar ratio of M:M':Al of about $(2/n):(0.2/n'):2$ to about $(2/n):(3/n'):2$.

9. The metal exchanged and impregnated zeolite material of claim 8, wherein metal cation M is a sodium cation.

10. The metal exchanged and impregnated zeolite material of claim 8, wherein metal cation M' is a copper, zinc, manganese, silver, or iron cation.

11. The metal exchanged and impregnated zeolite material of claim 8, wherein metal cation M is a sodium cation and metal cation M' is a zinc cation.

12. The metal exchanged and impregnated zeolite material of claim 11, wherein the metal exchanged and impregnated zeolite material is zinc exchanged 13X.

13. The metal exchanged and impregnated zeolite material of claim 12, wherein the metal exchanged and impregnated zeolite material has a molar ratio of Na:Zn:Al of about 2:0.1:2 to about 2:1:2.

14. The metal exchanged and impregnated zeolite material of claim 12, wherein the metal exchanged and impregnated zeolite material has a molar ratio of Na:Zn:Al of about 2:1:2 to about 2:1.5:2.

* * * * *